(12) United States Patent
Bruso et al.

(10) Patent No.: US 7,542,983 B1
(45) Date of Patent: Jun. 2, 2009

(54) DELAYING AUTOMATED DATA PAGE MERGING IN A B+TREE UNTIL AFTER COMMITTING THE TRANSACTION

(76) Inventors: Kelsey L. Bruso, 3507 12th Ave. So., Minneapolis, MN (US) 55407; James M. Plasek, 5889 Alameda St., Shoreview, MN (US) 55126

( * ) Notice: Subject to any disclaimer, the term of this patent is extended or adjusted under 35 U.S.C. 154(b) by 215 days.

(21) Appl. No.: 11/600,611

(22) Filed: Nov. 16, 2006

(51) Int. Cl.
G06F 17/30 (2006.01)

(52) U.S. Cl. .......................... 707/101; 707/10; 707/100

(58) Field of Classification Search .................. 707/10, 707/100, 101
See application file for complete search history.

(56) References Cited

U.S. PATENT DOCUMENTS

| | | | | |
|---|---|---|---|---|
| 5,845,283 | A * | 12/1998 | Williams et al. | 707/101 |
| 6,032,147 | A * | 2/2000 | Williams et al. | 707/101 |
| 6,067,550 | A * | 5/2000 | Lomet | 707/202 |
| 6,560,607 | B1 * | 5/2003 | Lassesen | 707/101 |
| 6,606,626 | B1 * | 8/2003 | Ponnekanti | 707/8 |
| 6,856,993 | B1 * | 2/2005 | Verma et al. | 707/101 |
| 6,961,721 | B2 * | 11/2005 | Chaudhuri et al. | 707/1 |
| 6,978,279 | B1 * | 12/2005 | Lomet et al. | 707/202 |
| 7,020,611 | B2 * | 3/2006 | Gilde et al. | 704/270.1 |
| 7,020,661 | B1 * | 3/2006 | Cruanes et al. | 707/103 R |
| 2003/0182292 | A1 * | 9/2003 | Leong et al. | 707/100 |
| 2005/0256892 | A1 * | 11/2005 | Harken | 707/101 |
| 2006/0136442 | A1 * | 6/2006 | La Rosa Ducato et al. | 707/101 |
| 2008/0086470 | A1 * | 4/2008 | Graefe | 707/8 |

* cited by examiner

*Primary Examiner*—Don Wong
*Assistant Examiner*—Kim T Nguyen
(74) *Attorney, Agent, or Firm*—Charles A. Johnson; Robert P. Marley; Crawford Maunu

(57) ABSTRACT

Various approaches for processing a B+ tree data structure are described. In one approach, a first data record is deleted from the database as part of processing a first transaction. After removing the first data record, it is determined whether a first data page from which the record was removed should be merged. If the first data page is to be merged, merging of the data page is delayed until after the first transaction has been committed. After committing the first transaction, a nested transaction is initiated to merge of the first data page, and the nested transaction is committed after the data page has been merged.

20 Claims, 4 Drawing Sheets

DELAYING AUTOMATED DATA PAGE MERGING IN A B+TREE UNTIL AFTER COMMITTING THE TRANSACTION

FIELD OF THE INVENTION

The present invention generally relates to merging of data pages of a B+ tree in a database management system.

BACKGROUND

Relational databases generally require that every record be uniquely identified by one or a combination of columns. The column that uniquely identifies records is declared to be the primary key (PK) of the table.

A B+ tree data structure is often used to manage database records. In an example implementation, nodes that are leaves of the B+ tree are data pages of database records, and nodes that are parents of the leaves are index pages. The index pages contain primary key values for referencing records in the data pages. The leaves are also sequentially linked to provide sequential access to database records.

Multi-user database applications follow the transaction processing paradigm, which requires processing of transactions comply with the properties denoted as "ACID" (Atomicity, Consistency, Isolation, and Durability) as understood by those skilled in the art. Each transaction issued by the application specifies an operation on the database, and in processing that operation, the database management system (DBMS) adheres to the ACID properties. For consistency and durability, certain pages may be locked while updates are being made so that the state of data is consistent between transactions, and the updates or a specification of operations performed are retentively stored to provide recoverability in the event of a system crash.

Deleting records from the database may result in the database management system (DBMS) merging one or more pages. Merging a page generally involves removal of the page from the B+ tree and returning the page to a free list for subsequent use. In the B+ tree the index page and sequentially previous data page that references the removed page are updated to reflect that the page is no longer in the B+ tree. The user application may issue transactions that delete records, and the DBMS deletes pages from the B+ tree as may be necessary.

One approach to merging a page involves doing so during the course of processing a transaction. That is, in processing a delete transaction the DBMS detects the need to merge a page. The record is first deleted, the DBMS performs the merge of the page, and after the merge is complete, the transaction is committed.

While merging a page in a multi-user database the DBMS must lock the appropriate pages in order to preserve consistency of the data and supporting data structures. However, the locking of the pages during the merging of a page may delay the processing of other transactions. Other transactions seeking access to records stored in, or referenced by, the locked pages must wait to be processed until the transaction that resulted in the merging of the page merge commits its updates and the pages are unlocked. The wait time for the other transactions may range from a fraction of a second to minutes, depending on how quickly the transaction with the delete operation commits its updates. In some applications, the commit of the transaction may require manual user intervention, resulting in the delay being dependent on user attentiveness.

In another approach to merging pages, a DBMS may require a database administrator to periodically run a utility to merge pages. However, this requires additional time for managing the database.

A method and system that address these and other related issues are therefore desirable.

SUMMARY

The various embodiments of the invention provide methods and systems for processing a B+ tree data structure. In one method, a first data record is deleted from the database as part of processing a first transaction. After removing the first data record, it is determined whether a first data page from which the record was removed should be merged. If the first data page is to be merged, merging of the data page is delayed until after the first transaction has been committed. After committing the first transaction, a nested transaction is initiated to merge of the first data page, and the nested transaction is committed after the data page has been merged.

Another embodiment is a database management system that comprises a processor arrangement, a memory, and a mass storage arrangement. The memory is configured with instructions executable by the processor arrangement for processing a B+ tree data structure for data records of a database, and the mass storage arrangement is coupled to the memory for retentive storage of the B+ tree data structure. The processor arrangement in executing the instructions, deletes a first data record from the database in response to processing a first transaction that specifies deletion of the first data record; determines, after deletion of the first data record, whether a first data page from which the first data record was deleted, is to be merged; commits the first transaction before merging the first data page; initiates, after committing the first transaction, a nested transaction, wherein the nested transaction merges the first data page; merges the first data page, wherein the merge makes the first data page available for subsequent insertion of another data record during processing of the nested transaction; and commits the nested transaction after making the first data page available.

In another embodiment, an apparatus is provided for processing database operations. The apparatus comprises means, responsive to processing a first transaction that specifies removal of the first data record, for deleting a first data record from the database; means, responsive to the first data record having been removed, for evaluating whether a first data page from which the record was removed is to be merged; means, responsive to the first data page needing to be merged, for delaying merging of the first data page until after committing the first transaction; means, responsive to completion of commitment of the first transaction, for commencing a nested transaction that performs a merge of the first data page indicated by the stored reference; means, responsive to processing the nested transaction, for merging the first data page; means, responsive to completion of merging of the first data page, for committing the nested transaction.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

The various embodiments of the invention limit the duration for which a portion of a database is inaccessible during a merge operation. System performance may be improved by separating the merge operation from the commit of the transaction resulting in the merge. Rather than combining the merge operation with the transaction causing the merge and waiting for a user to commit the transaction, the transaction causing the merge is processed through commitment without performing the merge. After the transaction has been committed, a nested transaction is initiated to perform the merge. This limits the portion of the database that may be unavailable due to, for example, the user's delay in committing the transaction. In addition, locking fewer pages for a lesser period of time may reduce deadlock situations and eliminate unnecessary rollback of incomplete transactions.

Figure 1:
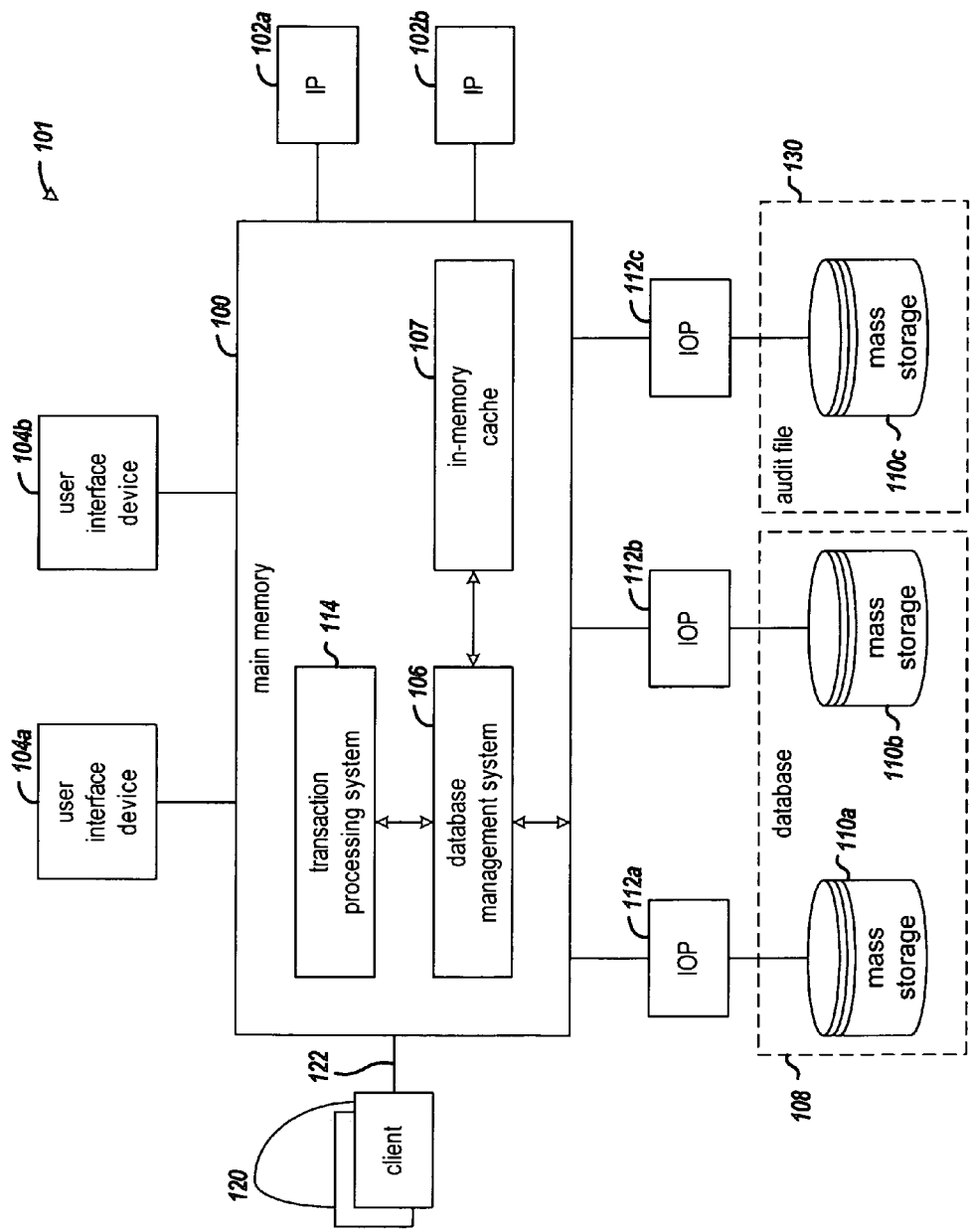
FIG. 1 is a block diagram of an example data processing system in which various embodiments of the invention may be implemented.

FIG. 1 is a block diagram of an example data processing system 101 in which various embodiments of the invention may be implemented. The example system illustrates a large-scale data processing system with multiple instruction processors (IPs) 102a and 102b. However, those skilled in the art will recognize that other types of data processing systems, such as a personal computer or a workstation may be used. The system includes a main memory 100 that is coupled to one or more IPs 102a and 102b. The memory may also be directly or indirectly coupled to one or more user interface devices 104a and 104b, which may include dumb terminals, personal computers, workstations, sound or touch activated devices, cursor control devices such as mice, printers, or any other known device used to provide data to, or receive data from, the data processing system.

A DBMS 106 is resident main memory 100 and executes on IPs 102a and 102b to manage and provide access to a database 108 (shown dashed). The database may be stored on an arrangement of one or more mass storage devices 110a and 110b. Mass storage devices may be hard disks or any other suitable type of non-volatile or semi non-volatile device. These mass storage devices may be configured as a Redundant Array of Independent Disks (RAID). As known in the art, this configuration provides a mechanism for redundantly storing multiple copies of the same data on multiple hard disks to improve efficient retrieval of the data, and to increase fault tolerance. Battery back up may be provided, if desired. The transfer of data between mass storage devices and DBMS is performed by Input/Output Processors (IOPs) 112a 112b, and 112c.

A transaction processing system 114 may be coupled to DBMS 106. The transaction processing system receives queries for data stored within database 108 from one or more users. Transaction processing system 114 formats the queries and then passes them to DBMS 106 for processing. DBMS 106 processes the queries by retrieving data records from, and storing data records to, the database 108.

The system of FIG. 1 may further support a client/server environment. In this case, one or more clients 120 are coupled to data processing system 101 via a network 122, which may be the Internet, an intranet, a local area network (LAN), wide area network (WAN), or any other type of network known in the art. Some, or all, of the one or more clients 120 may be located remotely from data processing system.

For purposes of database recovery, the DBMS may log data to the audit file 130 (or "audit trail"). With each processed transaction, the DBMS may write to mass storage 110c data that describes updates to one or more pages of data of the database. If recovery of the database is required, the records in the audit file may be used to reconstruct the database.

Figure 2:
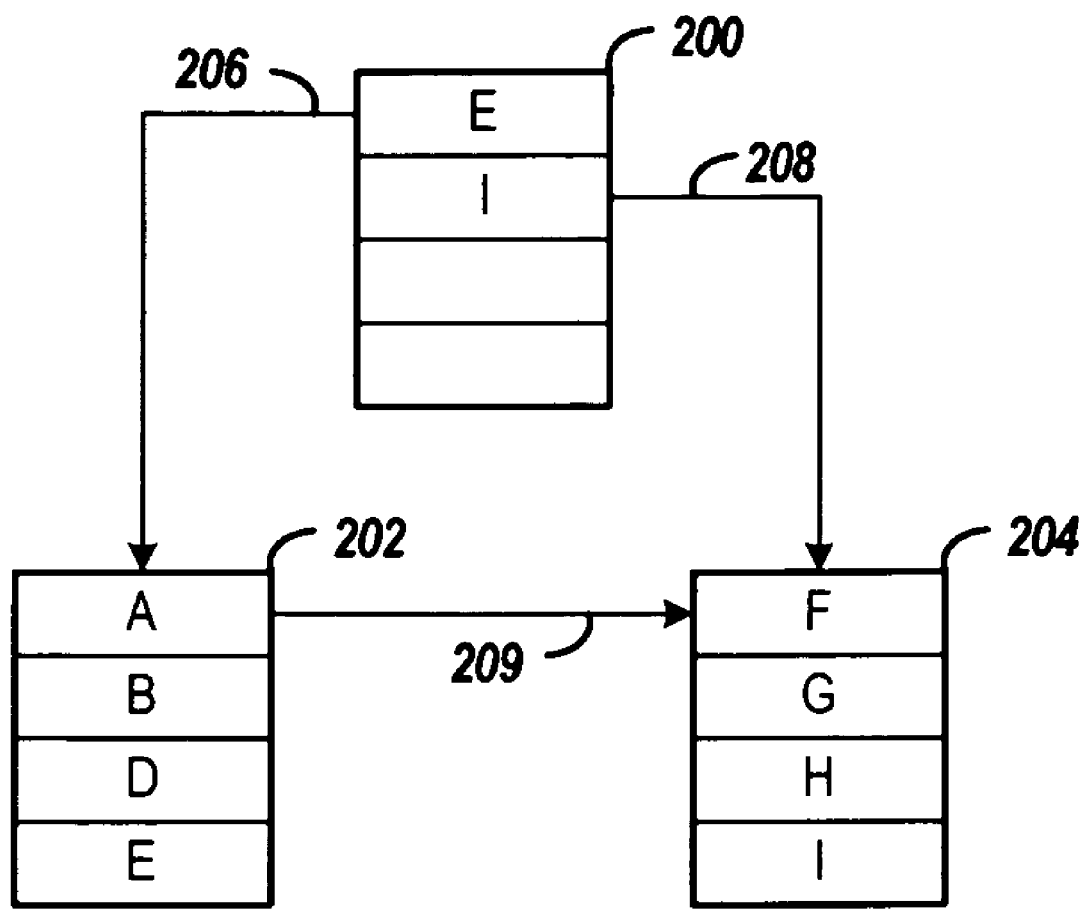
FIG. 2 is an example of a B+ tree structure that may be used to represent a database table.

FIG. 2 is an example of a B+ tree structure that may be used to represent a database table. In the illustrated B+ tree structure only the leaf nodes contain data records and the leaf nodes are sequentially linked. In another embodiment, a B-tree may be employed wherein data records are stored in both the non-leaf and the leaf nodes. The following discussion regarding the B+ tree of FIG. 2 illustrates the manner in which a sequence of records is appended to a tree according to prior art practices.

The tree of FIG. 2 includes a non-leaf node 200 and two leaf nodes 202 and 204, which are children of non-leaf node 200. Generally, non-leaf nodes store index values and pointers identifying the child nodes. For example, non-leaf node 200 stores a pointer 206 and an index value "E" that identifies leaf node 202. Similarly, the non-leaf node stores a pointer 208 and an index value "I" identifying leaf node 204. Pointers 206 and 208 may each be an address, an offset, or any other type of indicia that uniquely identifies, and allows for efficient traversal to, a selected one of the leaf nodes. The index values specify the key of the last record stored in the referenced leaf nodes. For example, index "E" indicates that any records having index values between the first index value, "A", and "E" will be located on leaf node 202, and any records having an index value after "E" but before, and including, "I" will be stored on leaf node 204. In another embodiment, non-leaf node 200 could store the index value for the first, rather than the last, record within the respective leaf node.

As discussed above, because the illustrated tree is a B+ tree, the non-leaf nodes do not store the actual data records. The data records are only stored on the leaf nodes. For example, leaf node 202 stores records A-E. Similarly, leaf node 204 stores records F-I. These records are stored within the leaf in a sort order dictated by the index values "A", "B", "C", and etc. These index values provide searchable data that are used to access a desired record. One or more index values may be used to arrange the records within a sort order. A primary and/or secondary key value may be used as an index value. As is known in the art, primary and secondary keys are searchable values identifying a record. In some embodiments, the primary key is used to uniquely identify a record. In other embodiments wherein each primary key value is not unique, some other mechanism such as a row identifier is used to uniquely identify each record.

As the database grows, the B+ tree will also grow to include additional data pages and additional index pages. Thus, an index page may be referenced by a parent index page in the B+ tree and may itself contain references to child index pages in the B+ tree.

In the tree of FIG. 2, leaf node 202 may store a pointer 209 to leaf node 204. This pointer may be an address or some other indicia that allows a sequential traversal of database records without traversing the index nodes of the tree. If desired, reverse pointers may be provided. For example, a pointer may be stored in leaf node 204 pointing to leaf node 202.

When non-leaf and leaf nodes are created, each of these nodes is allocated a predetermined amount of storage space by DBMS 106. The predetermined amount of storage space allocated to a node corresponds to a page of a file. The page size is usually based on the architectural characteristics of the underlying file system. For example, if the file system manages pages of 1792 bytes, the selected page size may be some multiple of 1792. A database administrator may select the size of the page, for instance. In one embodiment, the leaf nodes are the same size as the non-leaf nodes. In an alternative embodiment, the leaf nodes may be larger than the non-leaf nodes, or vice versa. In any event, DBMS 106 and any database application accessing the database are aware of the size of the leaf and non-leaf nodes.

Figure 3A:
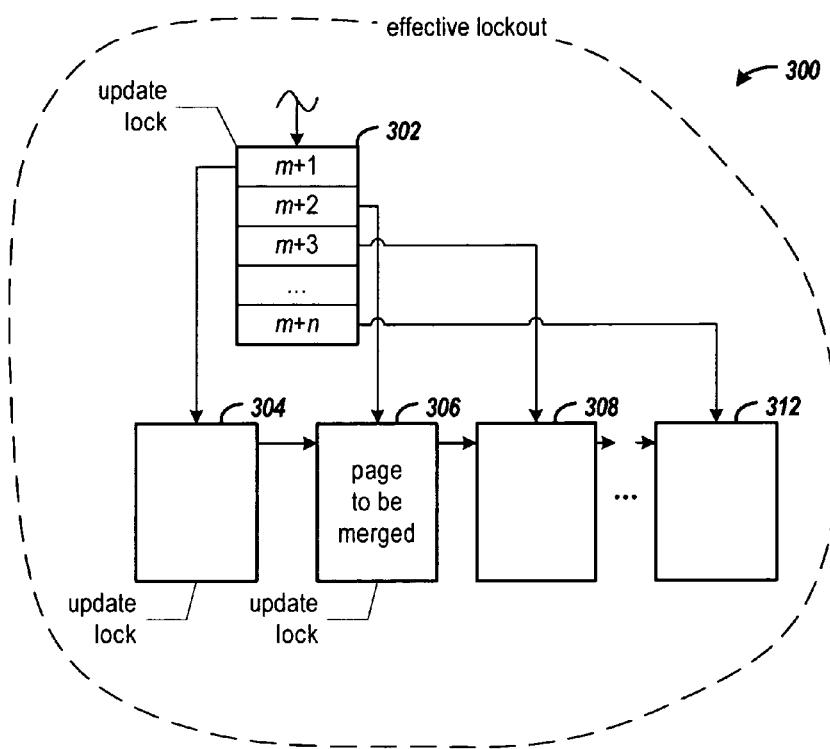
FIG. 3A illustrates the state of a portion of a B+ tree while a page is being merged.
Figure 3B:
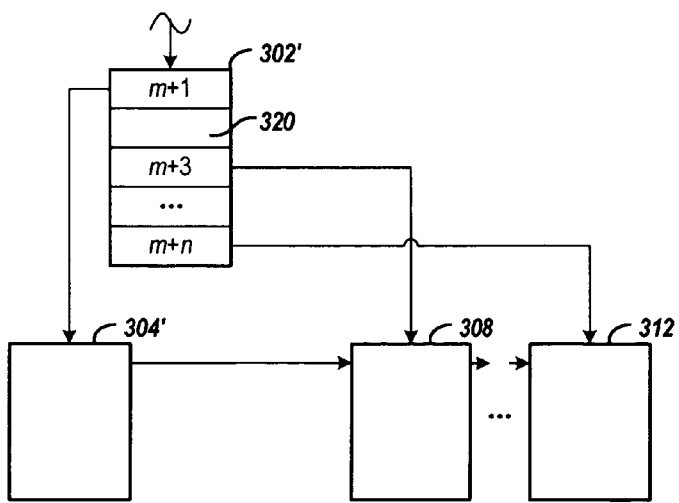
FIG. 3B illustrates the state of the portion of the B+ tree after the page has been merged.

FIG. 3A illustrates the state of a portion 300 of a B+ tree while a page is being merged, and FIG. 3B illustrates the state of the portion 300 of the B+ tree after the page has been merged. Index page 302 includes index records that reference data pages having data records m+1, m+2, m+3, m+n. Data page 304 contains record m+1, data page 306 contains record m+2 and is the page to be merged, data page 308 contains record m+3, and data page 312 contains record m+n.

As a precondition to merging data page 306, update locks are obtained on index page 302 and data pages 304 and 306 to protect the integrity of the database. There are different types of locks as recognized by those skilled in the art. The update lock prevents other transactions from reading or updating the locked pages.

The lock on the index page 302 affects not only the data page to be merged, but all data pages referenced by that index page. Thus, if a large number of data pages are referenced by the index page, a large portion of the database may be inaccessible to other transactions. In the example, the update lock on index page 302 effectively locks data pages 308 and 312 in addition to the data pages 304 and 306 for which update locks were explicitly obtained.

As shown in FIG. 3B, after page 306 has been merged, the index record 320 formerly referencing data page 306 is marked empty, and data page 304' is linked to data page 308. The update locks are released once the updates have been committed. It will be appreciated that in an alternative implementation the index records on the index page may be compressed such that index record 320 would reference data page m+3 instead of being empty after the merge. Some implementations may select between the two techniques depending on the situation.

The duration for which a portion of the database is inaccessible during a merge operation may be limited and performance thereby improved by separating the merge operation from the commit of the transaction resulting in the merge. Rather than combining the merge operation with the transaction causing the merge and waiting for a user to commit the transaction, the transaction causing the merge is run to completion and then committed without performing the merge. After the transaction has been committed, a nested transaction is initiated to perform the merge. This limits the portion of the database that may be unavailable due to, for example, the user's delay in committing the transaction.

The following transaction descriptions illustrate separation of the merge operation from the parent transaction. Example 1 below describes a traditional approach for merging a page.

Begin transaction
Delete record, page merge needed
Perform page merge
Commit transaction
End transaction

EXAMPLE 1

The transaction of Example 1 involves deleting a record from the database. Once the record is deleted, the DBMS determines that a merge is required of the page from which the record was deleted. As part of the merge operation, the DBMS obtains update locks on the affected pages, for example, pages 302, 304, and 306 in FIG. 3A. Once the locks are obtained, the data page can be removed and the B+ tree modified as shown in FIG. 3B. Depending on the application, the delay between the merge and the commit of the transaction may be arbitrary and unpredictably long. This may leave a sizeable portion of the database inaccessible because the DBMS will not release the locks until the transaction has been committed. In addition, if multiple data pages are to be merged and multiple index pages are involved, the number of unavailable pages may be very large.

In accordance with various embodiments of the invention, the merge operation is restructured relative to the transaction causing the merge, thereby reducing the time during which pages are unavailable and reducing the number of pages that are unavailable during the merge. The transaction operations of Example 2 illustrate the separation of the merge operation from the operation that caused the merge.

Begin transaction
Delete record r, merge of page x needed
Delete record s, merge of page y needed
Commit transaction (deleting r and s)
Begin nested transaction (merge x)
Perform merge of page x
Commit nested transaction
End nested transaction
Begin nested transaction (merge y)
Perform merge of page y
Commit nested transaction
End nested transaction
End transaction

EXAMPLE 2

The transaction of Example 2 involves the deletion of records r and s. Each deleted record results in the need to merge a data page. The deletion of record r results in the need to merge data page x, and the deletion of record s results in the need to merge data page y. Rather than merging pages x and y immediately, the merging of the pages is delayed until after the transaction has been committed.

After the transaction has been committed, a separate nested transaction is initiated for each of the data pages to be merged. Thus, in Example 2a first nested transaction is initiated for page x and a second nested transaction is initiated for page y. Note that the nested transaction for merging page y is not initiated until the nested transaction for merging page x is committed.

From this restructuring of the merge operations it may be observed that the uncertainty of the duration of the main transaction does not impact the availability of the index pages that reference pages x and y. The unavailability extends to only pages x and y until the transaction is committed. Once the transaction is committed page x is merged in a nested transaction. Page x, its sequential predecessor, and the parent index page will be locked, but the duration will not depend on the timing of a user's commit. After the merge of page x, another nested transaction is initiated to merge page y. Thus, it will also be recognized that separating the merge of page y from the merge of page x reduces the number of overall pages that are unavailable at any one time.

Figure 4:
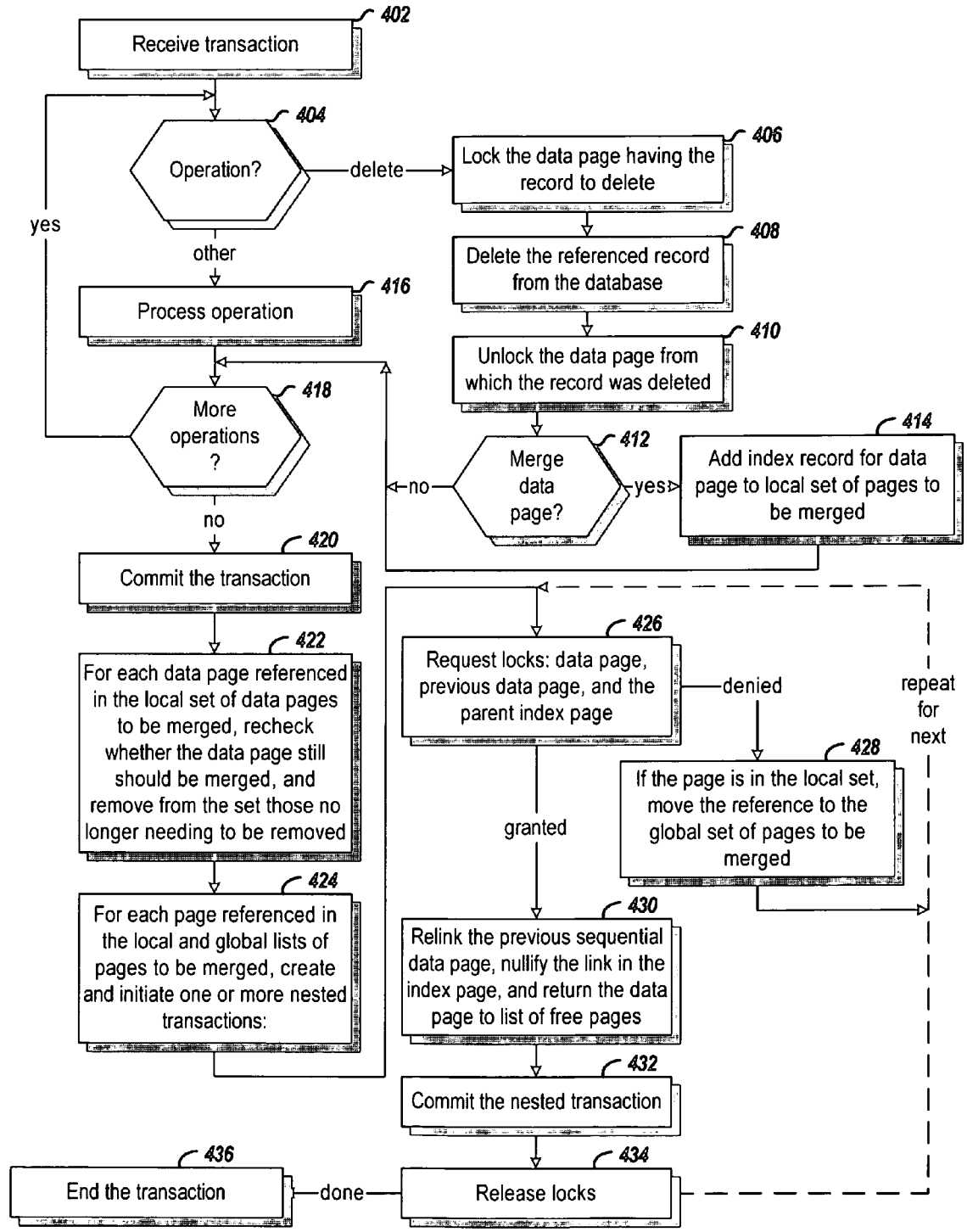
FIG. 4 is a flowchart of an example process for delaying automated merging of a page until after a delete transaction has committed in accordance with one or more embodiments of the invention.

FIG. 4 is a flowchart of an example process for delaying automated merging of a page until after a delete transaction has committed in accordance with one or more embodiments of the invention. Generally, the flow illustrates the operations performed in deleting a data record and merging of data pages in the context of processing a transaction. If the operation in a received transaction is a delete operation (step 402, decision step 404), an update lock is obtained for the data page having the record to delete (step 406). Once the lock is obtained, the referenced record is deleted from the data page (step 408), and after the record is deleted the lock is released on the data page (step 410).

Decision step 412 determines whether the data page from which the record was deleted is to be merged. Whether a data page is to be merged may depend on application requirements. In some applications it may be acceptable to wait until the data page no longer contains any records before merging the page. In other applications, it may be advantageous to merge a page once a portion of the page filled with data records falls below a selected threshold, e.g., 20%. For a partially full data page that is to be merged, those skilled in the art will recognize that the records of the page to be merged may be split between sequentially adjacent pages in the B+ tree. If the data page is to be merged, an index record for the data page is added to a local set of pages to be merged (step 414). The index record is used later to locate both the parent index page and the data page being merged. The index record is saved instead of the parent index page because this user, or another user, may have split or merged that index page, thereby causing the index record for the data page being merged to be moved to a different index page. The index record is used in step 426 to locate the parent index page by searching the B+ tree for the index value stored in that index record.

The index record contains a reference to (or address of) the data page to be removed, as well as the index value. The local set of pages to be merged accumulates references to those pages to be merged and is processed once the transaction is committed. The local set of pages is local in that the set is processed before the end of the transaction that caused the pages to need to be merged. A global set of pages is also maintained, and those pages in the local set for which locks are unavailable are added to the global set of pages. The pages in the global set are considered for merging in processing transactions other than the transactions that caused the pages to need to be merged.

For an operation other than a delete (e.g., insert or update), that operation is suitably processed (step 416), and decision step 418 returns to decision step 404 if there are additional operations in the transaction to process. Also, after having added an index record to the local set of pages to merge, the process is directed to step 418.

Once all the operations in the transaction have been processed, the transaction is committed (step 420). This may involve user direction (such as clicking "OK") depending on the application.

In some transactions, a deletion may be followed by an insertion. Thus, a data page identified as needing to be merged and added to the local set of pages to merge, may subsequent to the deletion have a record inserted and no longer need to be deleted. For each page in the local set of data pages to be merged, the process rechecks whether that page still needs to be merged. If a page in the local set no longer needs to be merged, the index record for that page is removed from the set (step 422).

The pages referenced by both the global and local sets of pages to merge are processed beginning at step 424. For each referenced page, a nested transaction is initiated beginning with the request for locks for the data page, the sequentially previous data page, and the parent index page (step 426). If any of the locks are denied, the page merge is not processed, and if the page is from the local set, the index record is moved to the global set of pages to merge (step 428). If the locks are granted, the referenced data page is merged from the B+ tree (step 430). The sequentially previous page is re-linked to reference the data page referenced by the data page being merged, the link in the index page is made null, and the data page is returned to a list of free pages maintained by the DBMS. The nested transaction is committed (step 432), and the locks on the sequentially previous data page, the parent index page, and the merged data page are released (step 434). If there are additional unprocessed pages to merge in the global and local sets, the process beginning at step 426 is repeated for another unprocessed page. Once all the pages to be merged have been considered for merging, and merged if locks were available, the transaction is ended (step 436).

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of systems that utilize B+ trees. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for processing a B+ tree data structure for data records of a database, comprising:

removing a first data record from the database in response to processing a first transaction that specifies removal of the first data record;

after removing the first data record, determining whether a first data page from which the record was removed should be merged;

in response to determining that the first data page should be merged, delaying merging of the data page until after committing the first transaction;

committing the first transaction, and after the committing, initiating a nested transaction, wherein the nested transaction performs a merge of the first data page; and in processing the nested transaction, merging the first data page, and committing the nested transaction after the merging.

2. The method of claim 1, further comprising removing from the database at least one data additional record in addition to the first data record in response to processing the first transaction and the first transaction specifying removal of the at least one additional data record;

after removing the at least one additional data record, determining whether each data page from which the at least one additional data record was removed should be merged;

in response to determining that at least one additional data page in addition to the first data page should be merged, delaying merging of the at least one additional data page until after committing the first transaction;

after the committing and in response to determining that the at least one additional data page should be merged, merging the at least one additional data page in a nested transaction.

3. The method of claim 2, further comprising:

after committing the first transaction and in response to determining that the at least one additional data page should be merged, creating a respective nested transaction for each at least one additional data page, wherein each nested transaction performs a merge of a respective one of the at least one data page; and committing a completed nested transaction prior to commencing another nested transaction.

4. The method of claim 3, further comprising:

after committing the first transaction, determining a second time whether the first data page should be merged;

in response to determining the second time that the first data page should be merged, performing the creating and commencing of the nested transaction; and in response to determining the second time that the first data page should not be merged, bypassing the initiating of the nested transaction.

5. The method of claim 1, further comprising:

after committing the first transaction, determining a second time whether the first data page should be merged;

in response to determining the second time that the first data page should be merged, performing the creating and commencing of the nested transaction; and in response to determining the second time that the first data page should not be merged, bypassing the initiating of the nested transaction.

6. The method of claim 1, further comprising:

requesting a first update lock for the first data page and a second update lock for a first index page that references the first data page;

in response to denial of either the requested first update lock or the second update lock, storing a reference to the first data page in a global merge set;

after committing updates to the database resulting from each processed transaction, for each reference to an index page in the global merge set, creating a respective nested transaction, wherein each nested transaction performs a merge of a respective one of a data page referenced in the global set; and committing each completed nested transaction prior to commencing another nested transaction.

7. The method of claim 1, further comprising:

obtaining an update lock on the first data page without obtaining an update lock on a first index page that references the first data page for the duration of the first transaction; and obtaining an update lock on the first data page and obtaining an update lock on the first index page for the duration of the nested transaction.

8. The method of claim 1, wherein determining that the first data page should be merged comprises determining that the first data page should be merged in response to a number of data records remaining on the first data page reaching a threshold value.

9. The method of claim 8, wherein the threshold value is 0.

10. The method of claim 1, wherein determining that the first data page should be merged comprises determining that the first data page should be merged in response to a percentage of the first data page that is used being less than a threshold value, wherein the threshold value is greater than zero.

11. A database management system, comprising:

a processor arrangement;

a memory coupled to the processor arrangement, the memory configured with instructions executable by the processor arrangement for processing a B+ tree data structure for data records of a database, wherein the B+ tree data structure is stored in the memory;

a mass storage arrangement coupled to the memory for retentive storage of the B+ tree data structure;

wherein the processor arrangement in executing the instructions, deletes a first data record from the database in response to processing a first transaction that specifies deletion of the first data record;

determines, after deletion of the first data record, whether a first data page from which the first data record was deleted, is to be merged;

commits the first transaction before merging the first data page;

initiates, after committing the first transaction, a nested transaction, wherein the nested transaction merges the first data page;

merges the first data page, wherein the merge makes the first data page available for subsequent insertion of another data record during processing of the nested transaction; and commits the nested transaction after making the first data page available.

12. The system of claim 11, wherein the processor arrangement in executing the instructions, deletes from the database at least one data additional record in addition to the first data record in response to processing the first transaction and the first transaction specifying deletion of the at least one additional data record;

determines, after deletion of the at least one additional data record, whether each data page from which the at least one additional data record was removed is to be merged;

delays merging of the at least one additional data page until after committing the first transaction, in response to the at least one additional data page needing to be merged;

initiates, after committing the first transaction and in response to the at least one additional data page needing be merged, a nested transaction that merges the at least one additional data page.

13. The system of claim 12, wherein the processor arrangement in executing the instructions, creates, after committing the first transaction and in response to the at least one additional data page needing to be merged, a respective nested transaction for each at least one additional data page, wherein each nested transaction performs a merge of a respective one of the at least one data page; and commits a completed nested transaction prior to commencing another nested transaction.

14. The system of claim 11, wherein the processor arrangement in executing the instructions, determines, after committing the first transaction, a second time whether the first data page should be merged;

initiates, in response to determining the second time that the first data page should be merged, the nested transaction; and bypasses, in response to determining the second time that the first data page should not be merged, the initiating of the nested transaction.

15. The system of claim 11, wherein the processor arrangement in executing the instructions,
- requests a first update lock for the first data page and a second update lock for a first index page that references the first data page;
- stores, in response to denial of either the requested first update lock or the second update lock, a reference to the first data page in a global merge set;
- creates, after committing updates to the database resulting from each processed transaction, for each reference to an index page in the global merge set, a respective nested transaction, wherein each nested transaction performs a merge of a respective one of a data page referenced in the global set; and
- commits each completed nested transaction prior to commencing another nested transaction.

16. The system of claim 11, wherein the processor arrangement in executing the instructions,
- obtains an update lock on the first data page without obtaining an update lock on a first index page that references the first data page for the duration of the first transaction; and
- obtains an update lock on the first data page and obtains an update lock on the first index page for the duration of the nested transaction.

17. The system of claim 11, wherein the processor arrangement in executing the instructions that determine whether the first data page should be merged, determines that the first data page should be merged in response to a number of data records remaining on the first data page reaching a threshold value.

18. The system of claim 17, wherein the threshold value is 0.

19. The system of claim 11, wherein the processor arrangement in executing the instructions that determine whether the first data page should be merged, determines that the first data page should be merged in response to a percentage of the first data page that is used being less than a threshold value, wherein the threshold value is greater than zero.

20. An apparatus for processing a B+ tree data structure for data records of a database, comprising:
- means, responsive to processing a first transaction that specifies removal of the first data record, for deleting a first data record from the database;
- means, responsive to the first data record having been removed, for evaluating whether a first data page from which the record was removed is to be merged;
- means, responsive to the first data page needing to be merged, for delaying merging of the first data page until after committing the first transaction;
- means, responsive to completion of commitment of the first transaction, for commencing a nested transaction that performs a merge of the first data page indicated by the stored reference;
- means, responsive to processing the nested transaction, for merging the first data page;
- means, responsive to completion of merging of the first data page, for committing the nested transaction.

* * * * *